Dec. 2, 1958  H. F. CAUDLE, SR., ET AL  2,862,344
LAWNMOWER EDGER ATTACHMENT
Filed Jan. 15, 1957                        2 Sheets-Sheet 1
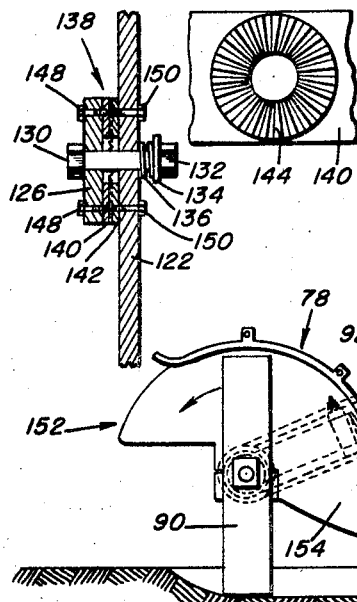
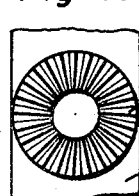
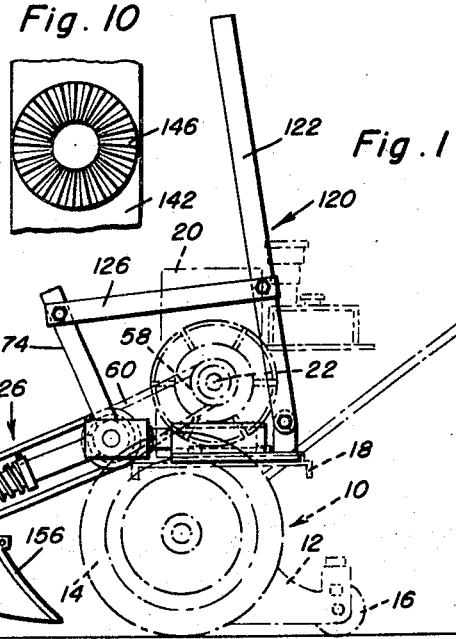
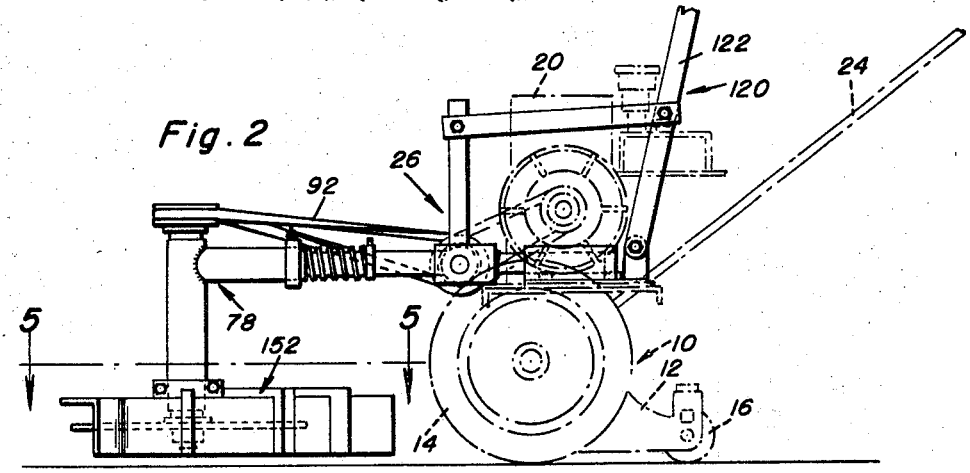
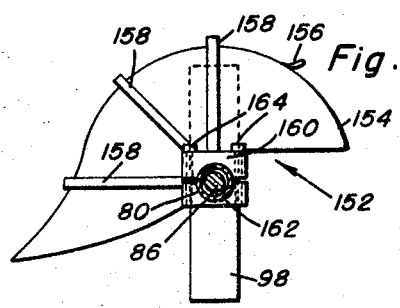
Harold F. Caudle, Sr.
Harold F. Caudle, Jr.
INVENTORS

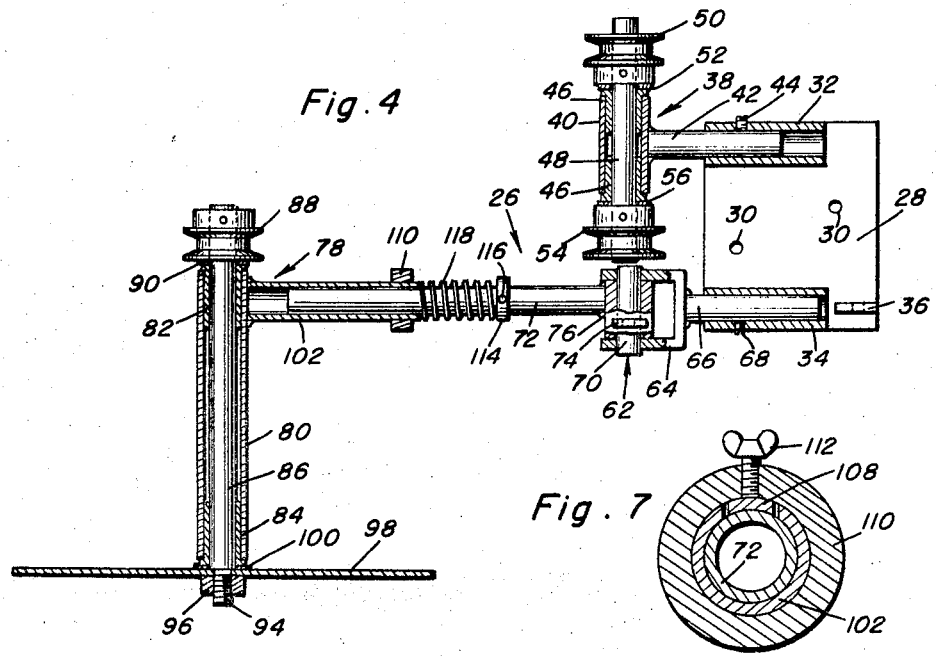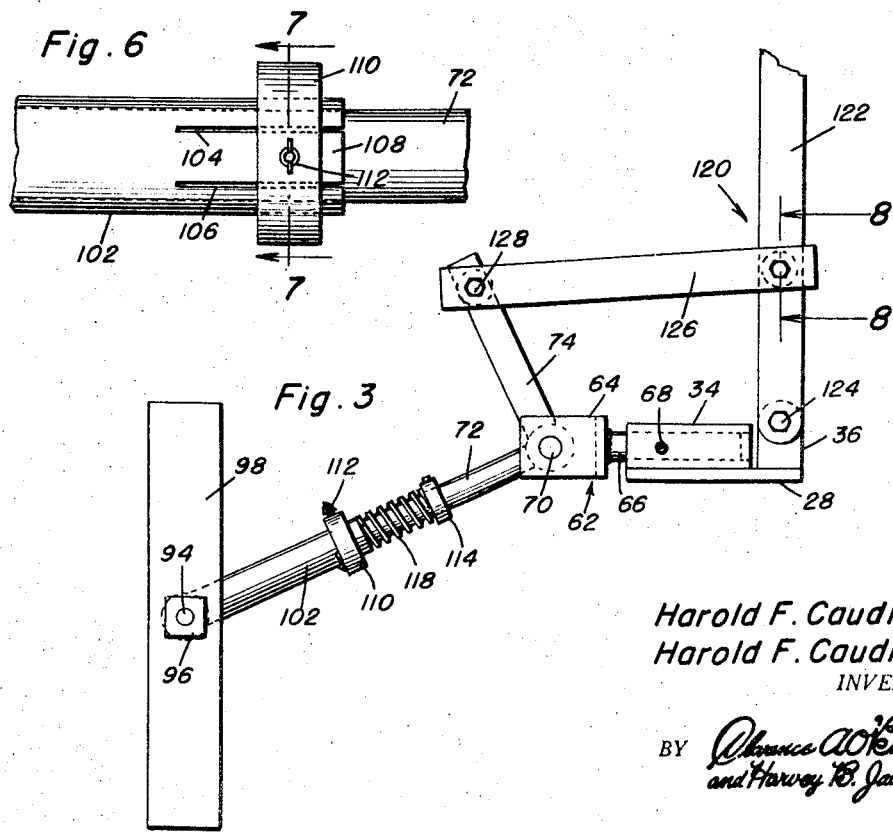

United States Patent Office 2,862,344
Patented Dec. 2, 1958

2,862,344

LAWNMOWER EDGER ATTACHMENT

Harold F. Caudle, Sr., and Harold F. Caudle, Jr., Miami, Fla.

Application January 15, 1957, Serial No. 634,356

1 Claim. (Cl. 56—25.4)

This invention relates in general to new and useful improvements in lawnmower attachments, and more specifically to an improved edger attachment.

The primary object of this invention is to provide a simple edger attachment for lawnmowers, the edger attachment being so constructed whereby it may be readily mounted on existing lawnmowers of the type which have a horizontal drive shaft and which may be readily driven from such horizontal drive shaft.

Another object of this invention is to provide an improved edger attachment for lawnmowers, the edger attachment being provided with a simple mounting plate which may be permanently secured to a lawnmower in an out-of-the-way position and which has the remainder of the edger detachably secured thereto whereby the edger may be stored if desired without alteration to the lawnmower.

Another object of this invention is to provide an edger attachment for lawnmowers, the edger attachment being provided with a control lever which has an inner locking clutch mechanism so that the edger attachment is retained in a selected adjusted position upon the release of the control mechanism thereof.

A further object of this invention is to provide an improved edger attachment for lawnmowers, the edger attachment including a power take-off shaft and a hinge, the hinge carrying a support which in turn carries the edger assembly, the power take-off shaft having an axis offset from the axis of the hinge whereby when the edger assembly is raised to an inoperative position, a drive belt therefore is automatically loosened so as to facilitate the starting of the lawnmower.

A still further object of this invention is to provide an improved edger for lawnmowers, the edger including an edger shaft carrying an edger blade, the edger shaft being so mounted whereby it may be selectively positioned either vertically or horizontally so that the edger blade may be selectively used for edging purposes or for trimming.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the edger attachment shown secured to the lawnmower, the lawnmower being shown in phantom lines only, the edger attachment having the edger shaft thereof in a horizontal position functioning as an edger;

Figure 2 is a side elevational view similar to Figure 1 and shows the edger attachment so mounted whereby the edger shaft is in a vertical position for a trimming operation;

Figure 3 is an enlarged side elevational view of a portion of the edger attachment removed from the lawnmower and shows the specific mounting of the edger shaft for swinging about a horizontal axis to facilitate the vertical positioning thereof;

Figure 4 is an enlarged horizontal sectional view taken through the edger attachment removed from a lawnmower and shows the specific details of the various components thereof, the guide for the edger blade being omitted for purposes of clarity;

Figure 5 is a fragmentary sectional view taken substantially upon the plane indicated by the section line 5—5 of Figure 2 and shows the specific details of the guard and the mounting thereof;

Figure 6 is an enlarged fragmentary elevational view showing the connection between the support arm and support member with the adjustable mounting of the edger assembly, the spring normally carried by the support arm being omitted;

Figure 7 is an enlarged fragmentary sectional view taken substantially upon the plane indicated by the section line 7—7 of Figure 6 and shows the manner in which the support member is retained in adjusted position on the support arm;

Figure 8 is an enlarged fragmentary sectional view taken substantially upon the plane indicated by the section line 8—8 of Figure 3 and shows the clutch mechanism for retaining the control linkage for the edger attachment in a selected position; and Figures 9 and 10 are fragmentary elevational views of opposed clutch members within the lock to retain the control mechanism in a selected position.

Referring now to the drawings in detail, it will be seen that there is illustrated in Figures 1 and 2 a conventional type of lawnmower which is referred to in general by the reference numeral 10. The lawnmower 10 is of the reel type and includes a frame 12. The frame 12 is supported by a pair of wheels 14, one only being shown, and by a rear roller 16. The frame 12 also includes an upper frame plate 18 carrying a suitable power unit 20 which is connected to a horizontal shaft 22. Directional control of the lawnmower 10 is obtained through a handle 24.

It is to be understood that the lawnmower 10 is only one of a plurality of lawnmowers on which the present invention may be mounted. The requirement for the lawnmower is that it be provided with a horizontal shaft and a frame such as to permit the mounting of the invention thereon. Accordingly, for the purposes of this invention, only the frame plate 18 and the horizontal shaft 22 must be considered.

Referring now to Figure 4 in detail, it will be seen that there is illustrated a majority of the components of the edger attachment which is the subject of this invention, the edger attachment being referred to in general by the reference numeral 26. The edger attachment 26 includes a flat mounting plate 28 which is provided with a plurality of bolt holes 30 to facilitate the mounting thereof on a lawnmower frame. The mounting plate 28 is provided with a pair of sleeves 32 and 34 along opposite edges thereof, the sleeves 32 and 34 being horizontally disposed and having parallel axes. Aligned with the axes of the sleeve 34 is an upstanding ear 36.

Adjustably carried by the sleeve 32 is a power take-off assembly which is referred to in general by the reference numeral 38. The power take-off assembly 38 includes an elongated sleeve 40 which has secured thereto a support arm 42. The support arm 42 is disposed at right angles to the sleeve 40 and has the opposite end thereof telescoped in the sleeve 32. The support arm 42 is retained in an adjusted position in the sleeve 32 by means of a setscrew 44.

Disposed within the sleeve 40 are suitable bushings 46. Passing through the bushings 46 and journaled therein is a power take-off shaft 48. Adjustably carried by one end of the power take-off shaft 48 is an initial drive pulley 50. The drive pulley 50 is spaced from the bushing 46 by means of a thrust washer 52. Carried by the opposite end of the power take-off shaft 48 is a drive pulley 54 which is spaced from its associated bushing 46 by means of the thrust washer 56.

Referring once again to Figures 1 and 2 in particular, it will be seen that when the edger attachment 26 is mounted on the lawnmower 10 it is necessary that the horizontal shaft 22 thereof be provided with a pulley, the pulley being referred to by the reference numeral 58. The pulley 58 is aligned with the pulley 50 and the two are connected together by drive belt 60. The drive belt 60 is properly tensioned by adjusting the position of the power take-off assembly 38. It is understood at this this time that the power take-off assembly 38 will always be positioned whereby the shaft 48 is horizontally disposed.

Referring once again to Figure 4 in particular, it will be seen that carried by the sleeve 34 is a mounting bracket which is referred to in general by the reference numeral 62. The mounting bracket 62 includes a yoke portion 64 which has secured thereto a supporting shaft 66. The shaft 66 is telescoped within the sleeve 34 and retained in an adjusted position therein by setscrew 68 carried by the sleeve 34. The mounting bracket 62 also includes a hinge pin 70 carried by the yoke 64. It is to be understood that the mounting bracket assembly 62 is to be mounted whereby the axis of the hinge pin 70 is offset from the axis of the shaft 48 although the hinge pin 70 will be retained in a horizontal position.

Mounted on the hinge pin 70 within the confines of the yoke 64 and extending from the mounting bracket 62 in a direction opposite to the shaft 66 is a support arm 72. Also mounted on the hinge pin 70 within the confines of the yoke 64 and extending generally at right angles to the support arm 72 is a crank 74, as is best illustrated in Figure 3. The crank 74 is secured to the support arm 72 as by welding 76 and is rotatable only with the support arm 72.

Carried by the support arm 72 remote from the mounting bracket 62 is an edger assembly which is referred to in general by the reference numeral 78. The edger assembly 78 includes an edger shaft sleeve 80 which is relatively elongated and which has disposed in opposite ends thereof bushings 82 and 84. Journaled in the bushings 82 and 84 and extending outwardly therebeyond is an edger shaft 86. The edger shaft 86 has adjustably positioned on one end thereof a driven pulley 88 which is spaced from its bushing 82 by means of a thrust washer 90. It is to be understood that when the edger shaft 86 is horizontally disposed, as is illustrated in Figures 1 and 4, the driven pulley 88 will be aligned with the drive pulley 54. In order to facilitate the driving of the edger shaft 86 by the power take-off shaft 48, a drive belt 92 is entrained over the pulleys 54 and 88, as is best illustrated in Figure 1.

The end of the edger shaft 86 remote from the driven pulley 88 is reduced and externally threaded as at 94. Removably secured to the edger shaft 86 by means of a nut 96 threadedly engaged on the reduced threaded portion 94 is an edger blade 98. The edger blade 98 is spaced from its bushing 84 by means of a thrust washer 100.

The edger shaft sleeve 80 is supported by a tubular support member 102 which is telescoped over that end of the support arm 72 remote from the mounting bracket 62. In order that the edger assembly 78 may be retained in a desired position, the end of the support member 102 remote from the sleeve 80 is slit as at 104 and 106 to form a depending section 108. Telescoped over the support member 102 is a collar 110 carrying a setscrew 112. The setscrew 112 engages the section 108 so as to clampingly engage it with the support arm to prevent relative movement between the support arm 72 and the support member 102.

Carried by the intermediate portion of the support arm 72 is a collar 114 which is locked in an adjusted position by means of a setscrew 116. Extending between the collar 114 and an adjacent end of the support member 102 is a coil spring 118 which is telescoped over the support arm 72. When the setscrew 112 is released, the coil spring 118 will function so as to move the support member 102 out on the support arm 72 to properly tension the drive belt 92. Thus when the setscrew 112 is tightened down, the drive belt 92 will be automatically retained at its proper tension.

As is best illustrated in Figures 1 and 2, when the edger attachment 26 is to be used for edging purposes, the edger shaft 82 will be horizontally disposed and the edger blade 98 will be vertically disposed. On the other hand, should it be desired to utilize the edger attachment 26 for trimming purposes, then the edger assembly 78 is rotated 90° on the support arm 72 so that edger shaft 86 is vertically disposed and the edger blade 98 is horizontally disposed, as is best illustrated in Figure 2.

In order that the edger blade 98 may be retained in a desired vertical position, there is carried by the mounting plate 28 control means which are referred to in general by the reference numeral 120. The control means 120 includes a control lever 122 which is normally outstanding and which has the lower end thereof pivotally connected to the ear 36 by means of a pivot bolt 124. Pivotally carried by a lower portion of the control lever 122 is the rear end of a link 126. The forward end of the link 126 is pivotally connected to an upper part of the crank 74 by means of a pivot bolt 128.

Referring now to Figures 8, 9 and 10 in particular, it will be seen that there are illustrated the details of the connection between the link 126 and the control lever 122. Pivotally connecting together the link 126 and the control lever 122 is an elongated pivot bolt 130 which has adjustably retained thereon a nut 132. The nut 132 bears against a washer 134 which in turn bears against a spring 136, the spring 136 bearing against the control lever 122.

Disposed intermediate the control lever 122 and the link 126 is a clutch assembly which is referred to in general by the reference numeral 138. The purpose of the clutch assembly 138 is to retain the control means 120 in a selected position upon the releasing of the control lever 122. The clutch assembly 138 includes a pair of opposed clutch plates 140 and 142 which have serrated surfaces 144 and 146, respectively. The serrated surfaces 144 and 146 interlock and are disposed in opposed relation. The clutch plate 140 is secured to the link 126 by means of suitable fasteners 148 and similar fasteners 150 are used to secure the clutch plate 142 to the control lever 122.

It is desired that the edger blade 98 be provided with a suitable guard which is referred to in general by the reference numeral 152. The guard 152 includes a side plate 154 and an overlying flange 156. The flange 156 is reinforced with respect to the side plate 154 by suitable reinforcing ribs 158 which are best illustrated in Figure 5. The rear surface of the plate 154 has secured thereto a mounting block 160. The ribs 158 are also secured to the mounting block 160. Associated with the mounting block 160 is a clamp block 162, the clamp block 162 being adjustably secured to the mounting block 160 by means of fasteners 164. The guard 152 is mounted by clamping the edger shaft sleeve 80 between the mounting block 160 and the clamp block 162.

Referring now to Figure 1 in particular, it will be seen that moving the control lever 122 rearwardly will raise the edger blade 90 and the movement of the control lever 122 forwardly will lower the edger blade 90. Thus the edger blade 90 may be retained in a selected vertical height by the control lever 122. When it is desired to start the power unit 20 of the lawnmower 10, the edger attachment 26 may be released by merely elevating the edger blade 90. This results in the movement of the pulley 88 towards the pulley 54 due to the offset mounting of the edger assembly 78.

The edger attachment 26 is secured on the lawnmower 10 by suitable bolts passing through the bolt holes 30. These bolts are preferably permanently secured to the frame 12 of the lawnmower 10 and are provided with nuts which are removable from the bolts to permit the removal of the edger attachment 26 as a unit without disturbing any of the adjustments thereof. In view of the simplicity of the connection between the edger attachment 26 and the lawnmower 10, it is unnecessary that the edger attachment 20 be mounted on the lawnmower 10 except when in use. Inasmuch as the edger attachment is a self-contained unit mounted on its own base, it may be replaced on a lawnmower with a minimum expenditure of time and effort and without adjustment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

An edger attachment for lawnmowers, comprising a mounting plate for attachment to the frame of a power mower, a pair of mounting sleeves rigidly fixed to said mounting plate in spaced parallel relation to each other, a power take-off assembly including a sleeve having a shaft journaled therein and provided with a support arm at right angles thereto slidably received in one of said mounting sleeves, said shaft having pulleys fixed to its opposite ends and said one mounting sleeve carrying means for fixing said support arm therewithin so that the power take-off shaft may be bodily moved to fixed position longitudinally of the associated lawnmower frame, a mounting bracket assembly including a yoke and a support shaft rigid therewith, said support shaft being slidably received in the other mounting sleeve and said other mounting sleeve carrying means for fixing the support shaft therewithin so that said yoke may be moved to longitudinally fixed positions relative to said power take-off shaft, an edger assembly including a support arm pivotally attached at one end to said yoke about an axis lying in a vertical plane parallel to said power take-off shaft, a tubular support member telescopically received on the opposite end of said support arm, an edger sleeve fixed to the free end of said support member at right angles thereto, an edger shaft journaled within said edger sleeve having its opposite ends projecting therefrom and respectively carrying an edger blade and a pulley, the last mentioned pulley being aligned with one of said pulleys on said power take-off shaft, means selectively fixing said support member on said support arm to maintain a predetermined spacing between said last mentioned pulley and said one pulley on the power take-off shaft in compensation for movement of said support shaft relative to said other sleeve to effect offsetting of the pivotal axis of the edger assembly rearwardly with respect to said power take-off shaft, and means for raising and lowering said edger assembly about its pivotal axis.

References Cited in the file of this patent

UNITED STATES PATENTS

| | | |
|---|---|---|
| 2,521,033 | Bell | Sept. 5, 1950 |
| 2,539,619 | Goodall | Jan. 30, 1951 |
| 2,643,503 | Noyes | June 30, 1953 |
| 2,663,137 | Asbury | Dec. 22, 1953 |
| 2,676,448 | Limberger | Apr. 27, 1954 |
| 2,721,432 | Machovec | Oct. 25, 1955 |
| 2,724,230 | Burmeister | Nov. 22, 1955 |
| 2,771,730 | True | Nov. 27, 1956 |
| 2,778,233 | Perry | Jan. 22, 1957 |